(12) United States Patent
Viswanath et al.

(10) Patent No.: US 7,162,211 B2
(45) Date of Patent: Jan. 9, 2007

(54) METHODS AND APPARATUS FOR TRANSMITTING INFORMATION BETWEEN A BASESTATION AND MULTIPLE MOBILE STATIONS

(75) Inventors: Pramod Viswanath, Bedminster, NJ (US); Rajiv Laroia, Bedminster, NJ (US); David N. C. Tse, Berkeley, CA (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 10/748,781

(22) Filed: Dec. 29, 2003

(65) Prior Publication Data

US 2004/0142714 A1 Jul. 22, 2004

Related U.S. Application Data

(62) Division of application No. 09/691,766, filed on Oct. 18, 2000, now Pat. No. 6,694,147.

(60) Provisional application No. 60/232,928, filed on Sep. 15, 2000.

(51) Int. Cl.
*H03C 7/02* (2006.01)
*H04B 1/02* (2006.01)
*H04B 7/02* (2006.01)

(52) U.S. Cl. .............. 455/101; 455/103; 455/104; 455/105; 455/132; 455/135; 455/550.1; 455/552.1; 455/553.1; 375/298; 375/269; 375/347; 370/334; 370/329; 370/348; 370/465

(58) Field of Classification Search .......... 455/101, 455/103–105, 132, 135, 550.1, 552.1, 553.1; 375/298, 269, 347; 370/334, 348, 465, 329
See application file for complete search history.

(56) References Cited

U.S. PATENT DOCUMENTS 4,485,357 A * 11/1984 Voorman .................. 332/145
4,835,791 A * 5/1989 Daoud ..................... 375/301
4,882,614 A * 11/1989 Kageyama et al. .... 375/240.01
5,267,297 A   11/1993 Kawano et al.
5,296,863 A * 3/1994 Sezai ...................... 342/371
5,305,353 A * 4/1994 Weerackody ............ 375/347
5,577,265 A * 11/1996 Wheatley, III .......... 370/335
5,689,439 A * 11/1997 Weerackody et al. .... 370/329
5,815,531 A * 9/1998 Dent ....................... 375/298
5,842,114 A   11/1998 Ozluturk
5,914,950 A * 6/1999 Tiedemann et al. ...... 370/348
5,926,768 A   7/1999 Lewiner et al.
5,960,039 A * 9/1999 Martin et al. ............ 375/267

(Continued)

FOREIGN PATENT DOCUMENTS

EP    0 986 282 A1    4/1999

(Continued)

*Primary Examiner*—Steven M. D'Agosta
(74) *Attorney, Agent, or Firm*—Straub and Pokotylo; Michael P. Straub

(57) ABSTRACT

Methods and apparatus for scheduling mobile stations (MSs) to download data and/or to control the rate of downloading to an MS from a base station (BS) as a function of downlink channel condition information are described. Artificial channel variations, which can be measured at the MS, and feedback to a BS for scheduling purposes, are introduced through the use of two or more transmitter antennas at a BS. Each of the antennas transmits a signal at the same frequency having the same information content, e.g., modulated data. However the signals are made to differ with time in their phase and/or amplitude to introduce what appear to be channel variations to the MSs.

8 Claims, 12 Drawing Sheets

U.S. PATENT DOCUMENTS

| | | | |
|---|---|---|---|
| 5,991,331 A * | 11/1999 | Chennakeshu et al. | 375/136 |
| 6,009,124 A | 12/1999 | Smith et al. | |
| 6,034,987 A * | 3/2000 | Chennakeshu et al. | 375/133 |
| 6,122,291 A | 9/2000 | Robinson et al. | |
| 6,212,242 B1 * | 4/2001 | Smith et al. | 375/299 |
| 6,229,795 B1 | 5/2001 | Pankaj et al. | |
| 6,321,082 B1 | 11/2001 | Katz | |
| 6,359,901 B1 * | 3/2002 | Todd et al. | 370/465 |
| 6,389,085 B1 * | 5/2002 | Salt | 375/347 |
| 6,411,655 B1 * | 6/2002 | Holden et al. | 375/269 |
| 6,463,301 B1 | 10/2002 | Bevan et al. | |
| 6,731,619 B1 * | 5/2004 | Ramesh et al. | 370/334 |

FOREIGN PATENT DOCUMENTS

| | | |
|---|---|---|
| EP | 0 915 632 A2 | 12/1999 |
| EP | 1 154 665 A2 | 11/2001 |
| WO | WO 98/29975 | 7/1998 |
| WO | WO 98/35514 | 8/1998 |
| WO | WO 99/30520 | 6/1999 |
| WO | WO 99/63713 | 12/1999 |

* cited by examiner

METHODS AND APPARATUS FOR TRANSMITTING INFORMATION BETWEEN A BASESTATION AND MULTIPLE MOBILE STATIONS

RELATED APPLICATIONS

The present application is a divisional of allowed pending U.S. patent application Ser. No. 09/691,766, which was filed on Oct. 18, 2000 now U.S. Pat. No. 6,694,147 which claims the benefit of U.S. Provisional Patent Application Ser. No. 60/232,928, filed Sep. 15, 2000.

FIELD OF THE INVENTION

The present invention relates to communications systems and, more particularly, to methods and apparatus for communicating between base stations and mobile stations.

BACKGROUND OF THE INVENTION

Several technologies are competing to provide wireless data and/or voice service. Competing technologies include the Third Generation (3G) wireless standard which uses Code Division Multiple Access (CDMA); High Data Rate (HDR) by Qualcomm; and Flash-OFDM by Flarion Technologies the assignee of the present application. Such services confront similar problems concerning efficient allocation of communication resources between individual base stations (BSs) and the mobile stations (MSs) served by an individual BS. Consider the downlink of a wireless communication system. Here a single BS communicates with a set e.g., plurality, of MSs. The information transmitted to the users comes with certain delay and rate requirements. For example, voice has a constant but fairly small rate requirement and fairly stringent delay requirements. Data traffic e.g., Internet downloads, streaming video, file transfers, on the other hand, have requirements that vary from the type of traffic and can be very bursty in nature as compared to voice traffic. Thus, allocating a constant rate channel permanently to a user is usually wasteful in terms of resources. In view of the above discussion, there is a need for improved methods and apparatus for allocating bandwidth between users.

SUMMARY

The present invention is directed to methods and apparatus for enhancing overall throughput in communications systems, e.g., mobile communications systems, wherein some flexibility in the scheduling of transmission times to users corresponding to, e.g., different stations, is possible. Scheduling users when data comes to them results in a more flexible use of the system resources, e.g., power and bandwidth, than constantly allocating them a fixed amount of resource as is generally done in the cellular telephone where live audio conversations are being supported.

In the present application, communications stations used by system users are referred to herein as mobile stations (MS) since the invention is described in the context of a mobile communications system. However, it is to be understood that the techniques of the present invention can be applied where channel conditions may vary. Accordingly, the techniques of the present invention can be applied to both mobile as well as stationary communications stations.

In accordance with one embodiment of the present invention a base station (BS) transmits data to various MSs. The BS decides which MS to transmit to at any given time. Assuming that information, e.g., data, needs to be transmitted to multiple MSs, it is the responsibility of the BS to arbitrate between the needs of the MSs and decide when and for how long data is to be transmitted to each MS. This process is sometimes referred to as scheduling, since data is scheduled for transmission to various MSs. As part of the scheduling process, the base station may allocate bandwidth, e.g., a range of frequencies to be used, and the amount of power to be used for transmission purposes.

The MSs of the present invention provides feedback to the BS regarding channel conditions. In accordance with one feature of the present invention, data to be transmitted to MSs is scheduled based on channel condition feedback information obtained by MSs. When channel conditions are good, data can, and is, transmitted at a higher rate, e.g., bits(s), than when channel conditions are bad. By factoring in channel condition information, data transmission to MSs is scheduled so that transmission will occur when an MS is experiencing good channel conditions, e.g., conditions permitting relatively few errors and thus high transmission rates. In accordance with the present invention, scheduling based on how good a channel each mobile station (MS) has is used to achieve greater overall BS throughput than, e.g., scheduling of transmissions in a round robin, or a random order independent of MS channel conditions.

In order to insure that each user will receive some data even when experiencing poor channel conditions for an extended period of time, in accordance with various embodiments of the invention the scheduling of data transmission to MSs may take into consideration factors other than channel conditions alone. For example, when users have high priority, e.g., because these users have paid more for the service, and/or if a user's applications have stringent delay requirements, e.g., as in the case of, streaming video, then the base station (BS) may schedule users even when their channel is not as good as desired or when it is worse than another user's channel. Overall BS throughput may take a hit under such circumstances as compared to embodiments which schedule transmission times solely or primarily based on channel conditions. This is particularly the case when there are stationary users who do not have a good channel.

In the case of a non-moving MS or fixed position user station, actual physical channel conditions may remain relatively constant over time.

In accordance with one feature of the present invention each BS creates an artificial channel variation, e.g., by transmitting the same information using different transmitters which are physically spaced apart. Assuming two transmitters, e.g., antennas are used, the first transmitter broadcasts a first signal with a first information, e.g., data content, while the second transmitter transmits a second signal with the same information content but with a different phase and/or amplitude. The difference, e.g., phase and/or amplitude, between the first and second signals is varied over time. At the receiver, the first and second signals interact and are interpreted as a single received signal. The amplitude of the received signal is measured and feed back to the BS as an indication of the channel conditions existing between the BS and MS.

Thus the BS can schedule the MS as a function of the feedback information including channel state information. As discussed above, the feedback information is then used as part of a general strategy of scheduling the user when the channel associated with the user's MS becomes good enough. This strategy can be used to improve the throughput of the downlink and is efficient even when some MSs are stationary and thus their channels tend not to be naturally changing.

The strategy of the present invention used in the context of one mobile communications system embodiment is as follows: We have n antennas at the BS and we multiply the signal (which is a complex number in the base band representation) that is sent to the MSs by complex numbers, e.g., scaling factors, $\alpha_1, \ldots, \alpha_n$ and send them on the air over the n antennas. These complex numbers may be, and in at least one embodiment are, chosen randomly in each time segment data is transmitted. Some desired, but not mandatory, properties of these complex scaling factors $\alpha_1, \ldots, \alpha_n$ are as follows:

1. The sum of magnitude squared of the $\alpha_i$ over a period of time, e.g., symbol period or multiple carrier signal periods, is equal to a constant.
2. From time segment to time segment, the complex scaling factors change in a continuous manner. This makes it easier for the receiver to track the channel variation and feed back a reliable estimate of the channel strength.

The artificial signal variation introduced through the BS transmitting the same information signal from multiple transmitters is something the BS can track using the channel condition feedback information obtained from the MSs. Accordingly, the BS can use this variation, in addition to actual channel variations, to schedule the MS when its channel is indicated as being good. As part of the scheduling process, in some embodiments, more bandwidth is allocated to MSs when their channel conditions are good than when they are poor. In addition, as part of the scheduling process, in some embodiments more power is allocated for transmission to an MS when the MS's channel conditions are good as opposed to when they are poor.

In fact, by the strategy described further below, the channel of the MS may be twice as good, in terms of the signal to interference ratio, as compared to the original channel, when the BS schedules an MS in accordance with the present invention.

In addition to facilitating scheduling of data transmission from a first BS to its MSs, the artificial signal variations of the present invention can be beneficial in the case where communications from multiple BS's overlap, e.g., in the case of overlapping communications domains. In such a case, the signals from one BS appear to another BS as channel noise. Since the present invention introduces variations into the signal transmissions between a first BS and an MS, a second, e.g., neighboring BS, will view the variations as variations in channel noise. Thus the neighboring BS can take advantage of points in time where the "noise" from the first BS is at its minimum to transmit to its own MSs.

In addition to using channel condition information to schedule transmission of data from a BS to an MS, channel condition information can be used in accordance with the present invention to schedule transmission of data from an MS to a BS. In one such embodiment, each MS signals the BS when it has data to upload. The BS arbitrates between the various MSs seeking to upload data and schedules the uploads as a function of the channel conditions existing between the various MSs and BS. In this manner, uploading can be scheduled between various MSs so that it is performed in an efficient manner.

Numerous additional features, embodiments, and advantages of the present invention are discussed in the detailed description which follows.

DETAILED DESCRIPTION

We will begin by describing a very specific example, thereby allowing the invention to first be explained in the context of downlink transmission using a narrowband frequency range and two antennas at the BS. A more general description of the invention follows this particular example.

Figure 1A:
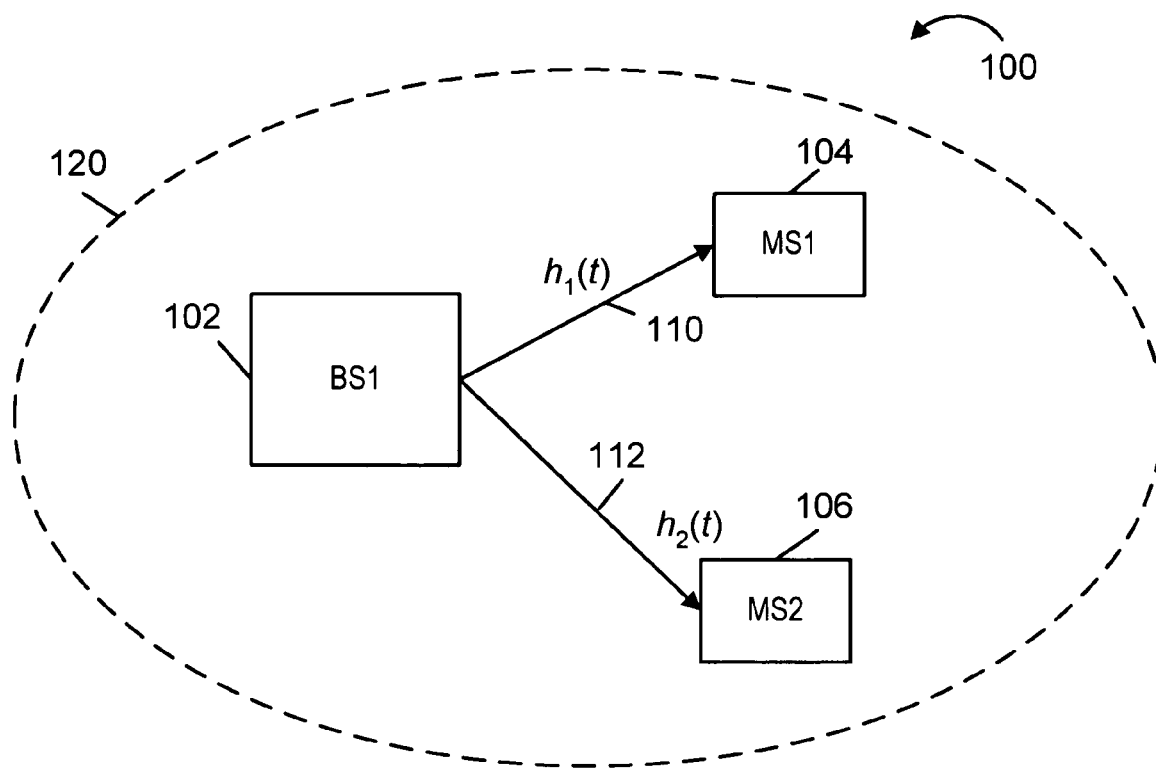
FIG. 1A illustrates a communications system including a base station and a plurality of mobile stations implemented in accordance with the present invention.

FIG. 1A shows an example downlink (represented by arrows 110, 112) in a wireless communication system 100. As illustrated, the communications system 100 includes a base station 102 and first and second mobile stations 104, 106. The basestation (BS) 102 has a fixed location and communicates with the first and second mobile stations MS1 104 and MS2 106 in some surrounding geographic territory 120 called a "cell" into which BS 102 broadcasts. FIG. 1 shows only the downlink, meaning, the transmissions 110, 112 from the BS to the MSs. In the FIG. 1A example, we refer to only two MSs 104, 106. However, the invention can be applied to any number N of MSs to which the BS 102 is communicating.

The arrows 110, 112 represent the individual communications links 110, 112 from the BS to the MSs 104, 106, respectively. These links will henceforth also be called channels since they represent communications paths or channels over which information can be downloaded to each MS 104, 106. These channels may vary with time due to movement of the MS and the scattering environment around the MS, and is also, e.g., tends to be dependent on the frequency at which the BS 102 communicates with the MS 104, 106 associated with the channels. Channel condition information is transmitted from MS1 104 and MS2 106 to BS1 and used, in accordance with the present invention, for scheduling the transmission of information from BS1 102 to MS1 104 and MS2 106.

Figure 1B:
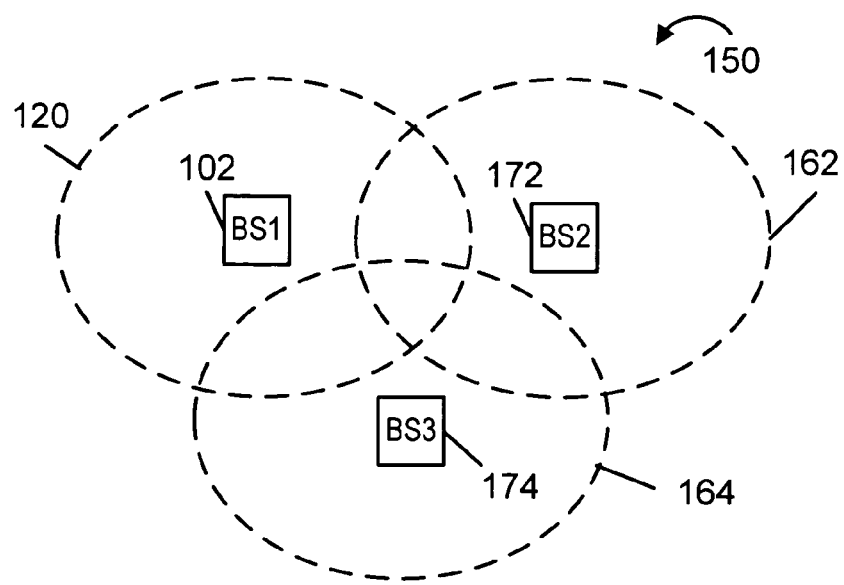
FIG. 1B illustrates a communications system including several of the systems of the type illustrated in FIG. 1 with overlapping broadcast regions.

Communications systems of the type illustrated in FIG. 1 may be grouped together to form a larger communications system 150 which comprises multiple cells 120, 162, 164 as illustrated in FIG. 1B. In the system 150, each cell includes one BS 102, 172, 174 and a plurality of MSs (not shown). Transmissions from one BS 102, 172, 172 can extend into the broadcast region of another cell causing signal interference. Areas where such interference may occur correspond to the locations where cells 120, 162 and 164 overlap. As will be discussed below, this interference can negatively effect channel conditions for MSs in areas where cells overlap.

Figure 2:
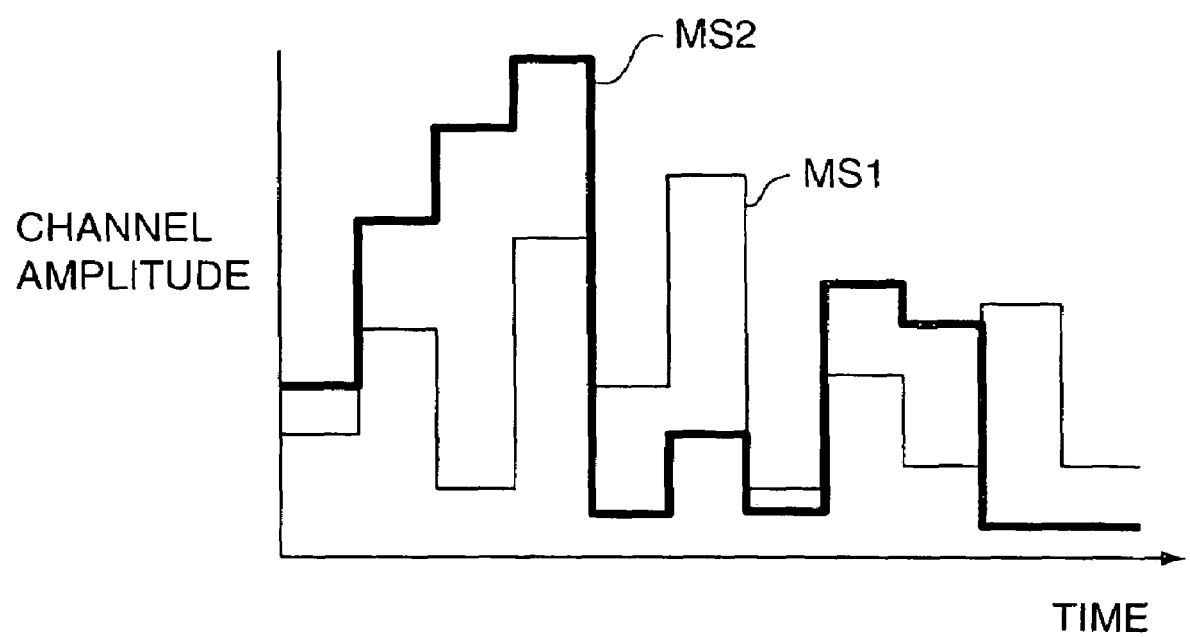
FIGS. 2 and 3 illustrate exemplary channel amplitude vs. time plots.
Figure 3:
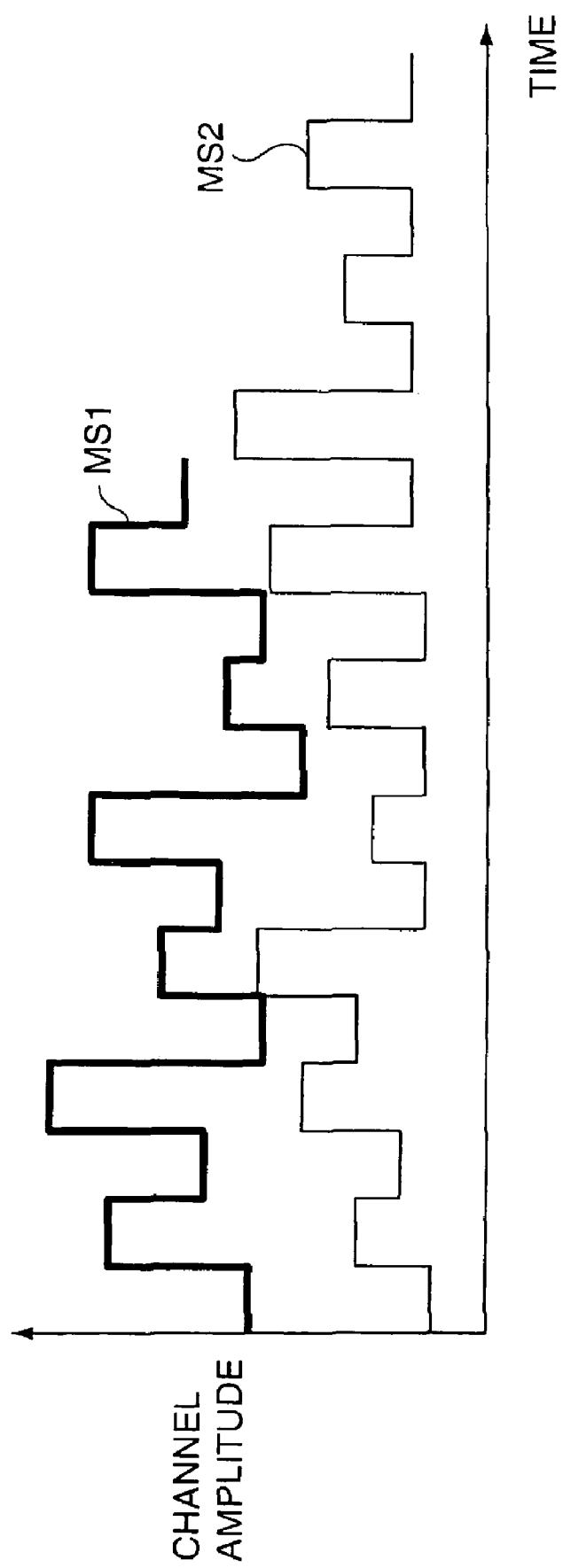

Referring once again to the FIG. 1A example, for simplicity, it is assumed that the BS 102 communicates to each MS 104, 106 on one single frequency, e.g., $f_k$ or over a band that is relatively narrow (1 MHz is relatively narrow enough for most situations) that is centered at $f_k$. This means that the channel may vary in time but is normally constant over the frequency range the BS 102 uses to transmit to the MS 104 or 106. In FIG. 1A the channel to MS1 is represented by $h_1(t)$ and the channel to MS2 by $h_2(t)$. The amplitudes of $h_1(t)$ and $h_2(t)$ vary with time. Exemplary signals $h_1(t)$ associated with MS1 104, and $h_2(t)$ associated with MS2 are shown in FIGS. 2 and 3. Here time t is "slotted", i.e., we measure time in terms of the number of symbols transmitted and thus time is indicated using positive integer values. The channel representation is by complex numbers (with real and imaginary parts) and is the so called "base band representation". The real part represents the channel gain when the BS 102 transmits a pure cosine waveform at the fixed frequency $f_k$ and the imaginary part represents the channel gain when the BS 102 transmits a pure sine waveform at the fixed frequency $f_k$. As an example, the BS 102 could pick the data (denoted by $m_1(t)$, a string of bits 1s and 0s) to transmit. Assuming k=0, the BS 102 modulates this onto the carrier: a complex tone at frequency $f_o$. In such a case, the transmitted signal is $$s(t) = m_1(t) \exp(j 2\pi f_o t)$$

and the signal received by MS1 104 will be $$s(t) h_1(t) + \text{thermal noise} + \text{interference, if any, from other BSs.}$$

Figure 4:
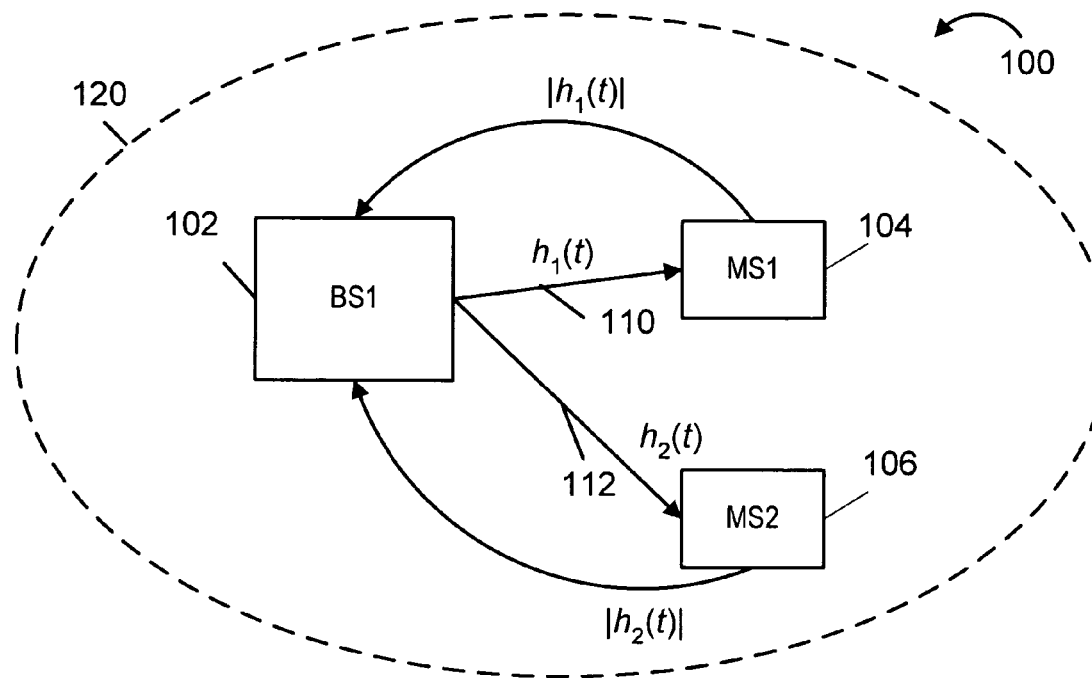
FIG. 4 illustrates the communications system of FIG. 1 with various feedback signals shown.

FIG. 4 illustrates the communication system 100 in greater detail with feedback signals being illustrated. In particular, FIG. 4 will be used to discuss a regime of "coherent reception" at the MS 104 or 106. Coherent reception is used to describe that MS1 104 and MS2 106 track their channels $h_1(t)$ and $h_2(t)$ (relative to the background noise level) respectively, as the channels vary. This is typically achieved by the BS 102 transmitting certain symbols called "pilots", known to the MS 104, 106 at known times. The MSs 104, 106 are able to estimate the quality of their channels from, e.g., the amplitude and/or phase, of these pilots. The MSs 104, 106 are able to feedback to the BS 102 channel condition information in the form of received signal amplitudes. Such amplitude feedback information is sometimes called channel "amplitudes". The channel condition information is transmitted to the BS 102 via links which are sometimes called uplinks.

The MSs 104, 106 can feedback both the amplitude and phase of the channel over which they are downloading information and thus feedback the entire complex channel value. The present invention can be used in embodiments which provide such detailed channel condition information as feedback.

However, this may be cumbersome and can cause a heavy load on the uplink used by the MS 104 or 106. Also, there is normally a delay in the process of feeding back the channel estimates from the MS 104, 106 to the BS 102. Thus there is an issue of reliability with regard to channel estimates received by the BS 102. Channel amplitude is usually more robust than channel phase information. For the above discussed reasons, transmission of channel amplitude information without phase information is used in the embodiments discussed below.

Henceforth, we will assume that the timescale of variation of the channel amplitude is slower than the timescale over which the channel changes. This is the case in most of the existing wireless communication systems. We will assume that the BS 102 has enough data to send to both the MSs 104, 106. Then the job of the BS 102 is to decide which MS 104 or 106 to transmit to, or to transmit to both MSs 104 and 106 simultaneously. Below are two exemplary strategies which may be implemented in accordance with the present invention.

1. The BS simply transmits to each MS 104, 106 one at a time, in a roundrobin fashion. The rate at which the BS 102 transmits to the MS 104 or 106 is determined by the BS as a function of the channel amplitude strength. In general, larger channel strengths, i.e., a channel with less signal loss, allows for a larger rate of data transmission than a channel with lower channel amplitude strength indicative of greater signal loss. Thus, the transmission rate of data to an MS is varied as a function of the quality of the channel which exists between the MS and the BS.

2. A better strategy is to transmit to one MS 104, 106 at a time, but select which MS to transmit to first based on the channel amplitude associated with each MS 104, 106. In accordance with the invention, the MS 104 or 106 with the larger channel amplitude indicative of a low signal loss, is chosen to be transmitted to first. In addition, the rate at which the BS 102 transmits is determined by the BS as a function of the channel amplitude.

Strategy 2 is likely to provide more downlink throughput than strategy 1. The extra gain by using strategy 2 can be quantified and can be quite large. However, for fairness reasons, as discussed above, the BS 102 may be required to choose an MS 104 or 106 even though it does not have the largest channel amplitude. For example, in FIG. 2, the amplitudes of the two channels are more or less symmetrically changing, whereas in FIG. 3, the amplitude of $h_2(t)$ is always below the amplitude of $h_1(t)$. In an extreme case, one MS 104 or 106 could be stationary, and thus its channel amplitude might not change very much with time. Let us further suppose that the channel amplitude of the stationary MS is poor relative to the other MS's channel amplitude. With strategy 2, the stationary MS, e.g., MS 106, will never be transmitted to. Thus, for fairness reasons, strategy 2 should be modified to allow transmissions to MSs, e.g., MSs that have not been transmitted to for a given amount of time, even though these MSs may not have the largest channel amplitude. This modification to strategy 2 can make the gain in throughput over strategy 1 smaller than when channel amplitude is the sole determining factor in selecting an MS 104, 106 to transmit to.

In accordance with one feature of the present invention discussed below, we propose a strategy the BS 102 can use to artificially create variation in the channel amplitudes of the MSs. This insures variations in feedback channel amplitudes which can be used to control transmission scheduling allowing for thereby increased throughput of the downlink over a pure round-robin allocation system.

Figure 5:
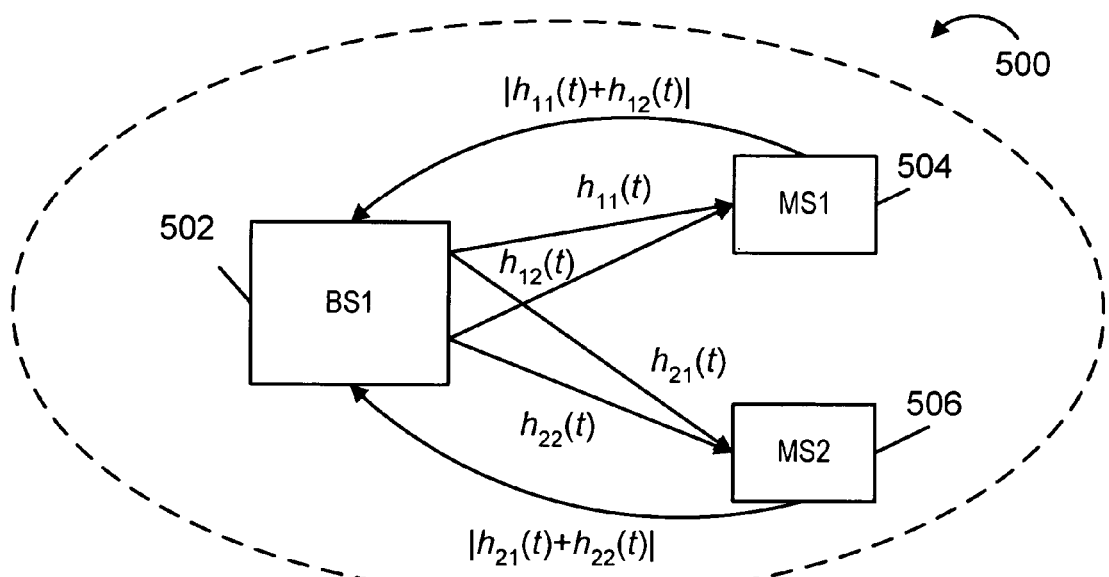
FIG. 5 illustrates a communications system of the present invention wherein multiple signals with the same information content are transmitted from a base station to each mobile station.
Figure 6:
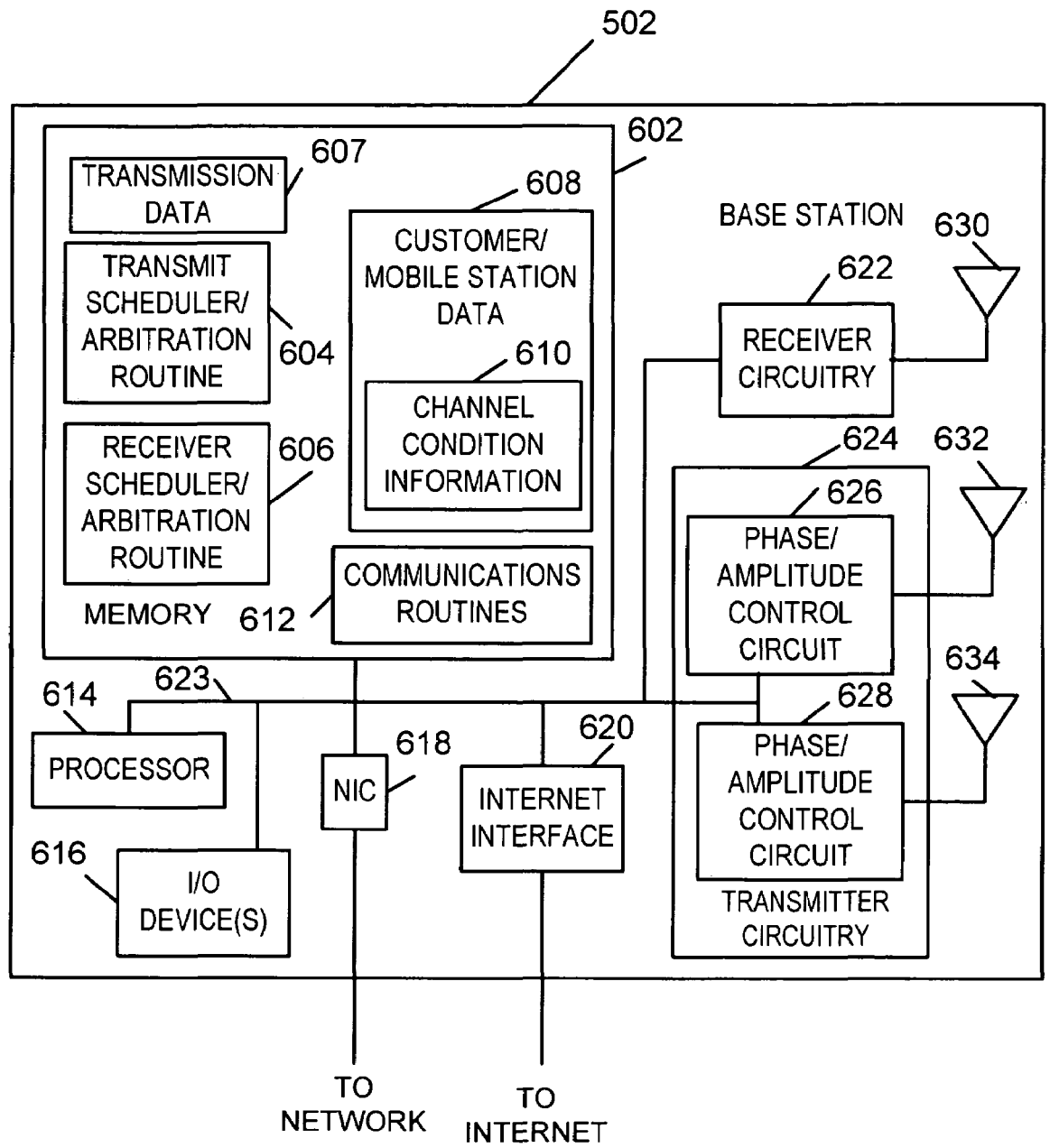
FIG. 6 illustrates a base station implemented in accordance with the present invention.

FIG. 5 shows a system 500 including a BS 502 and two MSs 504, 506. FIG. 6 illustrates an exemplary base station 502 in detail.

As illustrated in FIG. 6, the base station 502 comprises memory 602, a processor 614, I/O devices 616 such as a keyboard and display device, a network interface card (NIC) 618, an Internet interface 620, receiver circuitry 622, and transmitter circuitry 624 which are coupled together via bus 623. In addition, the base station 502 includes a receiver antenna 630 which is coupled to receiver circuitry 622. The base station 502 also includes multiple transmit antennas 632, 634 which are physically spaced apart from each other. Transmit antennas 632, 634 are used for transmitting information to base stations while receive antenna 630 is used for receiving information, e.g., channel condition feedback information as well as data, from MSs.

The processor 614, under control of routines stored in memory 602 is responsible for controlling the overall operation of the base station 502. I/O devices 616 are used for displaying system information to a base station administrator and for receiving control and/or management input from the administrator. NIC 618 is used for coupling the base station 502 to a computer network and optionally another base station 502. Thus, via NIC 618 base stations may exchange customer information and other data as well as synchronize the transmission of signals to mobile stations if desired. Internet interface 620 provides a high speed connection to the Internet allowing MS users to receive and/or transmit information over the Internet via the base station 502. Receiver circuitry 622 is responsible for processing signals received via receiver antenna 630 and extracting from the received signals the information content included therein. The extracted information, e.g., data and channel condition feedback information, is communicated to the processor 614 and stored in memory 602 via bus 623. Transmitter circuitry 624 is used to transmit information, e.g., data, and pilot signals to MSs via multiple antennas, e.g., antennas 632, 634. A separate phase/amplitude control circuit 626, 628 is associated with each of the transmit antennas 632, 634. The antennas 632, 634 at the BS 502 are spaced far enough apart so that the signals from the antennas go through statistically independent paths and thus the channels the signals go through are independent of each other. The distance between antennas 502, 504 is a function of the angle spread of the MSs, the frequency of transmission, scattering environment, etc. In general, half a wavelength separation, based on the transmission frequency, is usually sufficient. Accordingly, in various embodiments, antennas 502, 504 are separated by one half a wavelength or more, where a wavelength is determined by the carrier frequency $f_k$ of the signal being transmitted.

The phase and amplitude control circuits 626, 628 are responsible for performing signal modulation and for controlling the phase and/or amplitude of the signal to be transmitted under control of the processor 614. Phase/amplitude control circuits 626, 628 introduce amplitude and/or phase variations into at least one of a plurality, e.g., two, signals being transmitted to an MS to thereby create a variation, e.g., an amplitude variation over time, in the composite signal received by the MS to which information is transmitted from multiple antennas. The control circuits 626, 628 are also capable of varying the data transmission rate, under control of the processor 614, as a function of channel conditions in accordance with the present invention.

As mentioned above, the processor 614 controls the operation of the base station 502 under direction of routines stored in memory 602. The memory 602 includes a transmit schedule/arbitration routine 604, a receiver scheduler/arbitration routine 606, communications routines 612, customer/mobile station data 608 and transmission data 607.

The transmit scheduler/arbitration routine 604 is responsible for scheduling when data will be transmitted, e.g., downloaded, to MSs. As part of the scheduling process routine 604 arbitrates between the needs of various MSs to receive data. The memory 606 also includes a receiver scheduler/arbitration routine 606. The routine 606 is used to schedule when MSs will be allowed to upload data to the BS. As with the transmit scheduler 604, the receiver scheduler 606 may arbitrate between several MSs seeking to upload data at the same time. In accordance with the present invention, routines 604, 606 perform scheduling operations as a function of received channel condition feedback information. Communications routines 612 are used to determine the frequency and data rate as well as the appropriate encoding or modulation technique to be used for communications with each MS. Communications routine 612 can access the customer/mobile station data 608 to obtain relevant information used by the routines 612. For example, communications routines can access channel condition information 610 obtained from feedback to determine the appropriate data rate to be used in communicating to an MS. In addition, other stored customer information 608 can be retrieved and used to determine the appropriate modulation scheme, number of transmission antennas, and transmission frequency to be used when communicating with a particular MS scheduled to receive information.

While in some embodiments a single antenna is used to transmit information to an MS, the use of multiple physically separated antennas 632, 633 allows the same information to be transmitted from different locations with controlled phase and/or amplitude differences being introduced into at least one of the transmitted signals to produce an artificial signal variance at the receiving MS.

Figure 7:
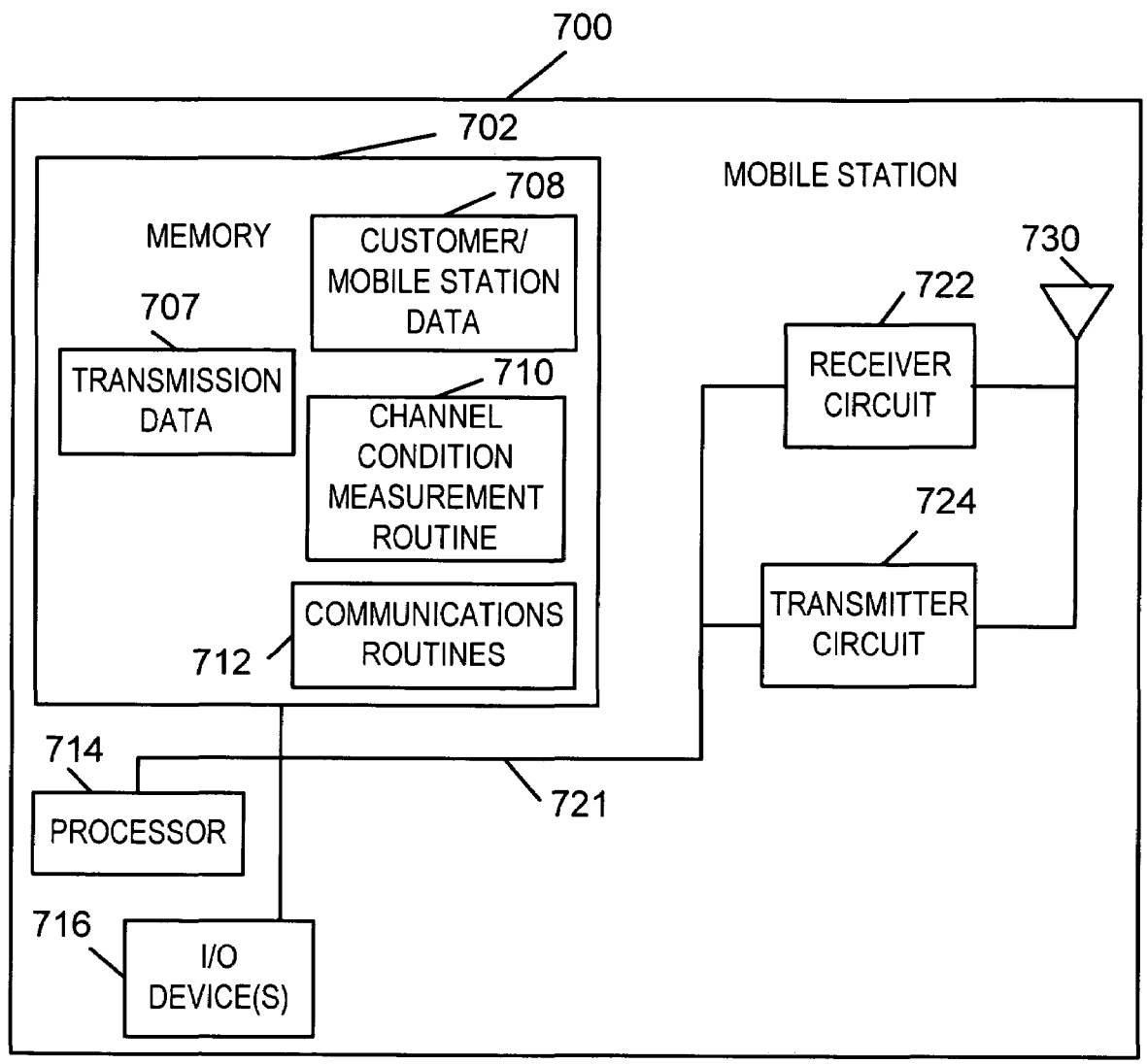
FIG. 7 illustrates a first exemplary mobile station implemented in accordance with the present invention.

FIG. 7 illustrates an exemplary mobile station 700 which may be used as any one of the MSs 104, 106. The mobile station 700 includes a memory 702, a processor 714, I/O devices 716, e.g., display, speaker and keypad, receiver circuit 722 and a transmitter circuit 724 which are coupled together by a bus 721. A single antenna 730 is coupled to both the receiver circuit 722 and transmitter circuit 724. However, separate receiver and transmitter antennas can be used if desired. Memory 702 includes several routines as well as data that are used by the processor 714 to control the MS 700.

The memory 702 includes customer/mobile station data 708, a channel condition measurement routine 710, communications routines 712 and data to be transmitted, e.g., transmission data 707. The communications routine 712 is responsible for controlling the transmission and reception of data by circuits 722, 724. Communications routine 712 may vary the data transmission rate, in accordance with the present invention based on channel conditions. In addition, it is responsible to scheduling information received from a BS to insure that data is transmitted by the MS at the times authorized by the BS. Channel measurement routine 710 is responsible for measuring channel conditions and supplying amplitude and/or phase feedback information to the communications routine 712 which then transmits it to the BS via transmitter circuit 724. Communications routines 712 are also responsible for controlling the display and/or audio presentation of received information to a MS user via I/O devices 716.

Referring once again to FIG. 5, it can be seen that the MSs 504, 506 each of which has a single receiver antenna, receives a composite of the signals broadcast from the two base station antennas 632, 634 included in base station 502. FIG. 5 shows the two channels from the antenna pair at the BS 502 to MS1 504 as $h_{11}(t)$ and $h_{12}(t)$ The MSs 504, 506 however each have a single antenna 730 and thus the MSs 504, 506 receives the composite signal. If the BS 502 transmits $s_1(t)$ and $s_2(t)$ at the two antennas 632, 634, then MS1 504 receives $$h_{11}(t)s_1(t)+h_{12}(t)s_2(t)+\text{thermal noise+interference (if any) from other BSs}$$

Consider the following choice of $s_1(t)$ and $s_2(t)$, assuming that the BS 502 has chosen the data to be transmitted to MS1 504.

$$s_1(t)=\sqrt{\alpha_t}m_1(t)\exp(j2\pi f_0 t)$$

$$s_2(t)=\sqrt{1-\alpha_t}m_1(t)\exp(j2\pi\delta_t)\exp(j2\pi f_0 t)$$

where

1. $\delta_t$ is a number between 0 and 1 that is randomly chosen for each time t uniformly between 0 and 1.
2. $\alpha_t$ is a number between 0 and 1 that is randomly chosen for each time t uniformly between 0 and 1.

Observe that the total energy in $s_1(t)$ and $s_2(t)$ is equal to the energy in $m_1(t)$ which is the same as the earlier case of using a single antenna. Now consider the case when $h_{11}(t)$ and $h_{12}(t)$ are constant with time t over which we are interested in communicating. Then the received signal at MS1 504 is $$(\sqrt{\alpha_t}h_{11}+\sqrt{1-\alpha_t}h_{12}\exp(j2\pi\delta_t))m_1(t)\exp(j2\pi f_0 t)+\text{thermal noise+outside interference}$$

Observe that the amplitude squared of the complex random number (random because $\alpha_t$ is random)

$$(\sqrt{\alpha_t}h_{11}+\sqrt{1-\alpha_t}h_{12}\exp(j2\pi\delta_t))$$

varies from zero to $|h_{11}|^2+|h_{12}|^2$.

1. We get zero when $\alpha_t=|h_{12}|^2/(|h_{11}|^2+|h_{12}|^2)$ and $\delta_t=-\text{phase}(h_{11})-\text{phase}(h_{12})$.
2. We get the maximum of $|h_{11}|^2+|h_{12}|^2$ when $\alpha_t=|h_{11}|^2/(|h_{11}|^2+|h_{12}|^2)$ and $\delta_t=\text{phase}(h_{11})-\text{phase}(h_{12})$.

Thus, we have created an artificial variation of the composite channel received at the MS 504 and this channel varies in amplitude squared from 0 to $|h_{11}|^2+|h_{12}|^2$ randomly in time. If the time scale used to transmit to MS1 is long enough, then we can limit transmissions to MS1 504 to when MS1's amplitude squared is at or near the largest possible value—i.e., $|h_{11}|^2+|h_{12}|^2$ as indicated by the channel condition feedback information.

In practice, it may not be good to vary powers randomly at the two antennas (the signals fed to the amplifiers before the antennas normally should be continuous). We now discuss below some methods of achieving the effect of artificial channel variation in a continuous manner in accordance with the present invention.

1. We choose $\alpha_1=at$ modulo 1 and $\delta_t=\delta t$ modulo 1. The rates $\alpha$ and $\delta$ at which the signal powers and phases vary, can be appropriately chosen. The design criteria for these two rates are: the rates $\alpha$ and $\delta$ should be chosen small enough so that the composite channel seen by the MS 504 or 506 does not change too fast and thus, that the feedback of the channel amplitude (relative to the interference level) on the uplink by the MSs 504, 506 to the BS 502 is reliable. Also, we want the rates to be large enough so that the MSs 504, 506 do not have to wait too long to reach the maximum of their channel variations. Compared to the nonvarying channel case, whenever an MS 504, 506 is scheduled, the channel should be at least twice as good on the average in terms of the squared amplitude.
2. We could keep $\alpha_t=0.5$ fixed to be constant in time. In this case only the phase changes and we can see that the amplitude of the composite channel at the MS 504 or 506 now varies from $||h_{11}|-|h_{12}||$ to $|h_{11}|+|h_{12}|$.
3. The phase rotation itself (represented by $\delta$) can, and in various embodiments is, introduced using different ones of the following techniques:
   (a) Rotate the message symbols $m_1(t)$ themselves by the known quantity $\delta_t$ modulo $2\pi$.
   (b) Give the carrier frequency $f_0$ itself an offset equal to $\delta$.

With many MSs 504, 506 to which the BS 502 is communicating with, at any point in time, it will be very likely the case that there is at least one MS 504 or 506 for which the current choice of $\alpha_t$ and $\delta_t$ are such as to give the maximum amplitude squared of its channel. Then the BS 502 can simply decide to transmit to only this MS 504 or 506. The feedback required at the BS 502 from each MS 502, 504 is the composite channel amplitude detected by the MS 504, 506. Thus, the strategy described here applies equally well to the situation when there are more than two MSs. In fact, the more MSs, the more flexible the schedule at the BS 502 is, and thus the throughput tends to increase by using this strategy. Accordingly, the methods of the present invention can be applied to a system including N MSs, where N is a positive integer equal to or greater than two.

Figure 8:
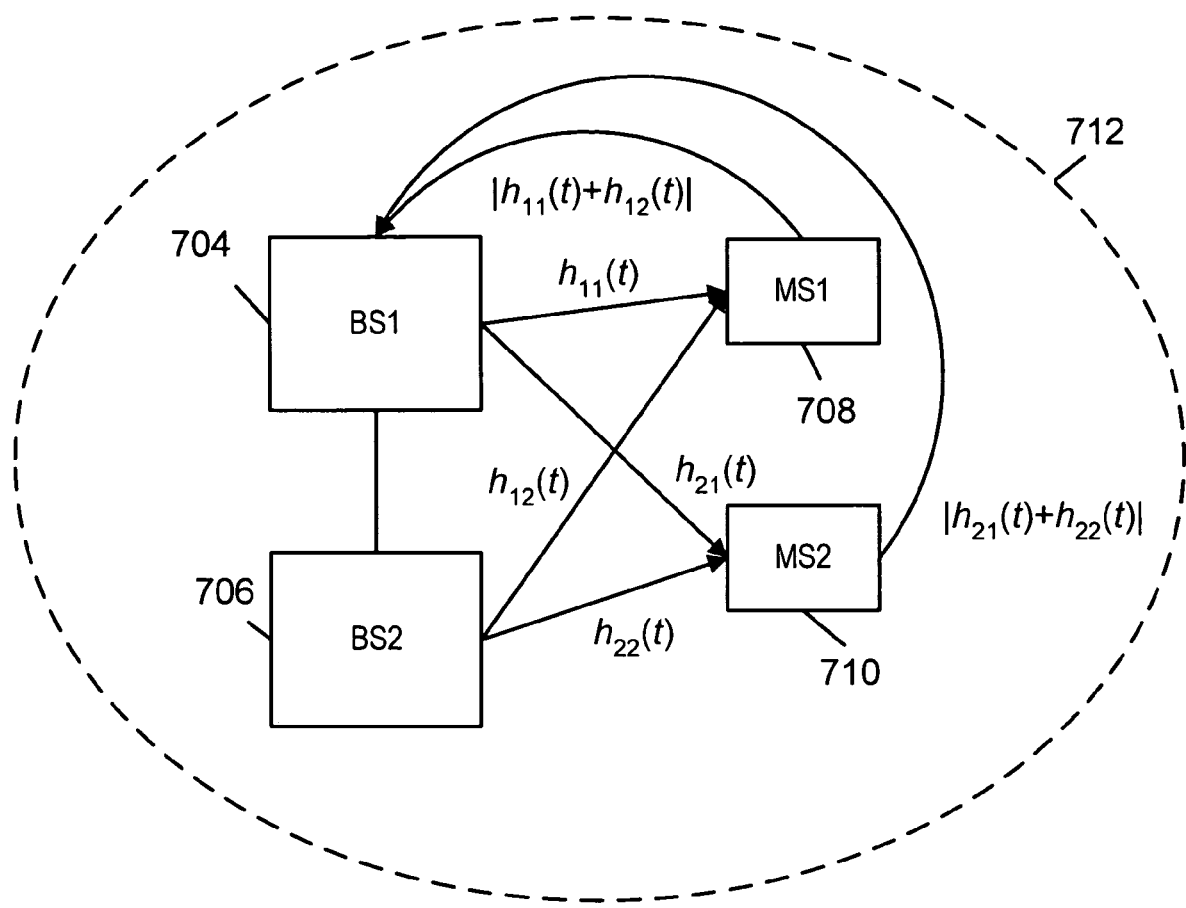
FIG. 8 illustrates a system of the present invention wherein two linked base stations operation in conjunction to transmit multiple signals to each mobile station.

While we have discussed the present invention in terms of broadcasting using two antennas coupled to a single base station, the broadcasting may actually be performed by two linked base stations 704, 706 which broadcast into the same geographic region 712 as illustrated in FIG. 8. In the FIG. 8 embodiment, BS1 704 receives channel feedback information and schedules transmissions to the MSs 708, 710. However, rather than use two antennas at BS1 704, a first signal is transmitted from BS1 and a second signal with the same information content but with a different phase and/or amplitude, is transmitted from BS2 706. NICs 618 included in each BS 704, 706 may be used to couple the base stations 704, 706 together via a network connection so that transmission and control functions can be coordinated between the two base stations 704, 706.

Figure 9:
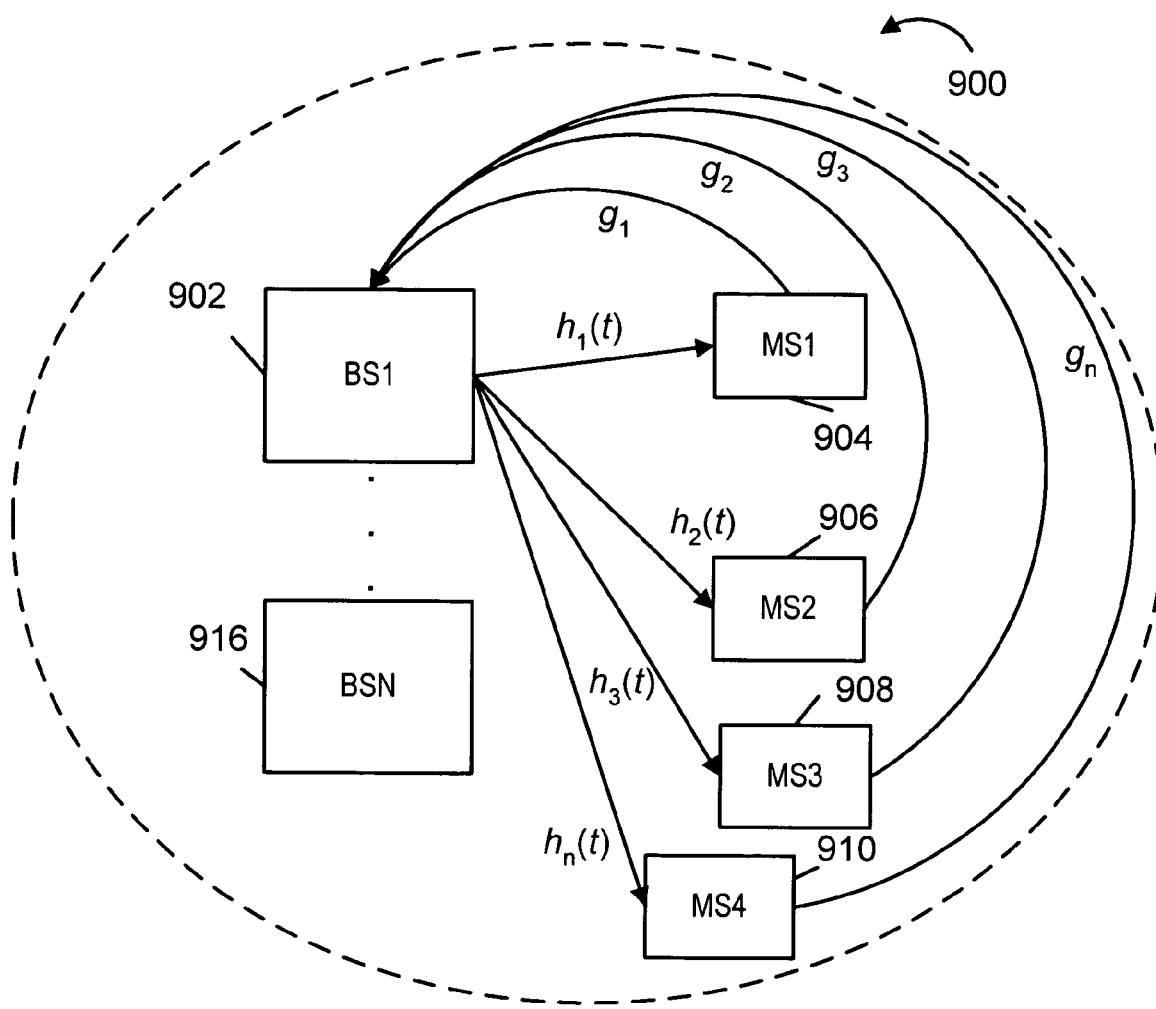
FIG. 9 illustrates a communications system wherein a plurality of base stations and mobile stations are located in the same broadcast region.

FIG. 9 shows the transmission between a BS 902 and many MSs 904, 906, 908, 910 in a geographic region 901 with N base stations 902, 916. Thus, in the system 900, given that there are multiple base stations in the same broadcast region, signal interference from neighboring base stations will be present. We have symbolically represented the links from the BS 102 to the MSs by $h_1, \ldots, h_n$ and the feedback from the MSs to the BS 902 by $g_1, \ldots, g_n$. Each link $h_1, \ldots, h_n$ may correspond to multiple independent signal paths, from separate antennas, which provide signals to each MS which are interpreted as a single composite signal. In the previous specific example, the reader was given examples of what the feedback signals could be, e.g., channel amplitude and/or phase information. However, the feedback signals need not be limited to just those specific exemplary quantities. The feedback quantities $g_1, \ldots, g_n$ give information to the BS 902 about the quality of the channel, e.g., an estimate of the rate and power at which the MSs 904, 906, 908, 910 can receive transmission from the BS 902 reliably.

One scheme to change the channel variation and use the resulting ordering of transmission channels based on quality for purposes of ordering transmissions to MS users is as follows:

1. Take the signal (in baseband) to be transmitted and multiply it by complex numbers $\alpha_1, \ldots, \alpha_n$. These complex numbers are generated randomly each time or made to vary slowly over time as described above. Two desirable properties for scaling factors is that:
    (a) the sum of the magnitude squared of the scaling factors be constant to maintain the same total transmission power at the BS 902; and
    (b) the scaling factors vary over their entire possible range in a continuous manner.
2. Use the feedback $g_1, \ldots, g_n$ from the MSs 904, 906, 908, 910 to decide which order to transmit signals to MSs and thus, users of the MSs. Several scheduling policies can be used here, however, the MSs which have good channel conditions are normally favored over those with bad channel conditions. The overall scheduling policy can include priorities of the users, fairness to users, and other such conditions. In addition, transmission rates to the MSs may be determined based on the feedback information.

The bottom line is that by making the channel variation happen by the antenna scheme discussed above, even where there is no physical variation in channel conditions, our scheme coupled with the ordering of the transmission to the users based on the feedback from them allows gain in throughput of the wireless communication system due to reduced interference from neighboring BSs.

In the case where an MS can potentially communicate with multiple BSs, e.g., due to overlapping coverage as in the FIG. 9 illustration, the above described scheme can, and in some embodiments is, applied on the uplink as well where uplink is the communication from an MS to a BS. In one such case, an MS 904, 906, 908, 910 selects the BS 902 or 916, from a plurality of possible BSs, to transmit to based on channel condition information with the channels with good conditions being preferred over channels with bad or worse conditions.

The methods and apparatus of the present invention can be applied to other scenarios including those discussed below.

Figure 10:
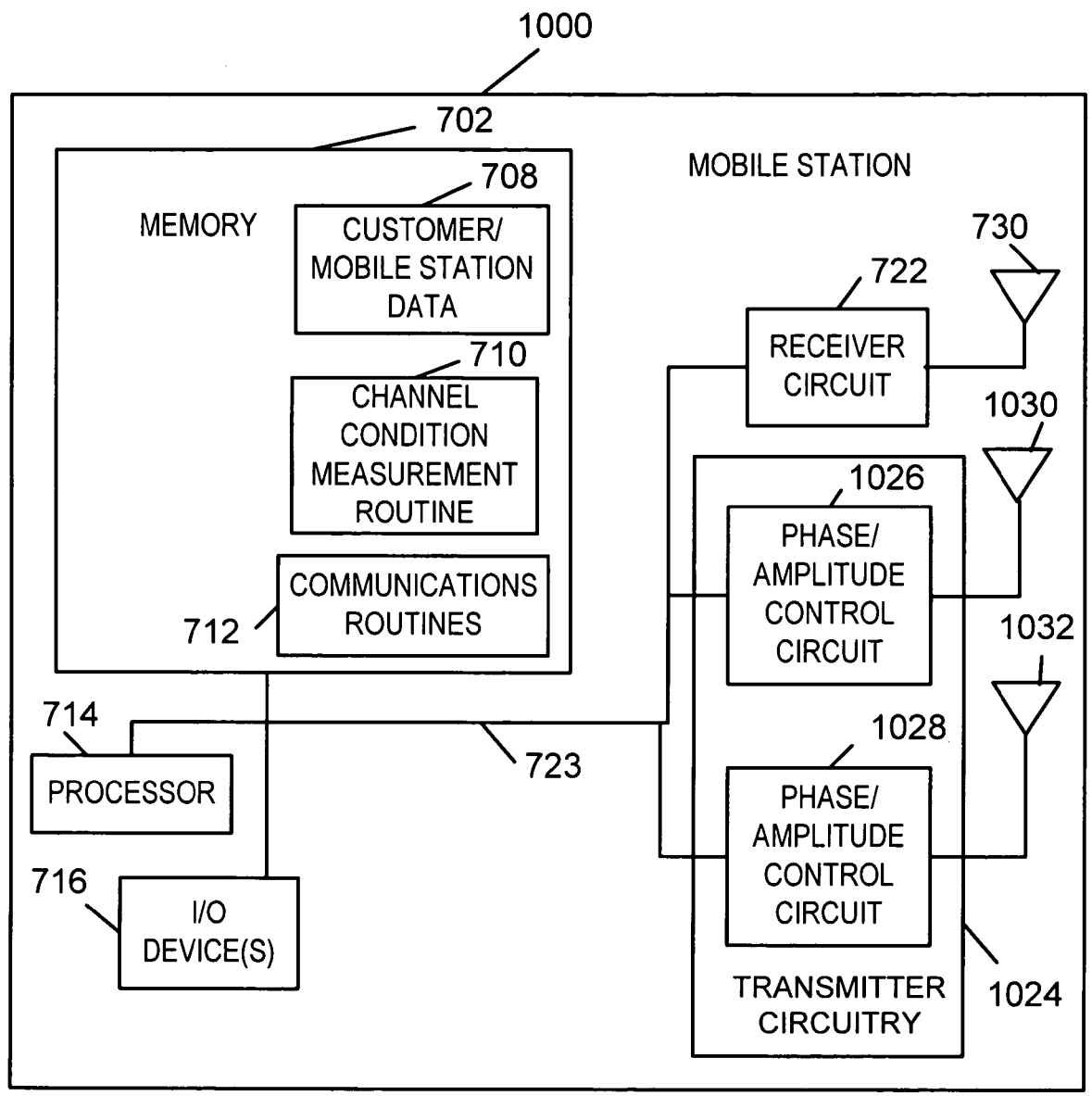
FIG. 10 illustrates an exemplary mobile station which includes multiple broadcast antennas implemented in accordance with the present invention.

The scheduling and rate control techniques of the present invention can be used to schedule and control uplink transmissions to the BS. In such a case, multiple antennas will be used at each of the MSs. FIG. 10 illustrates an MS 1000 which is similar to the previously described MS 700 but includes multiple transmit circuits 1024, 1026 and transmit antennas 1030, 1032 in accordance with the present invention. As in the case of a BS implemented in accordance with the present invention, transmit antennas 1030, 1032 are spaced apart so their signals travel to a BS over different paths while the transmitter circuits are used to introduce phase and/or amplitude variations into the signals being transmitted by the two antennas 1030, 1032. In such an embodiment the BS measures the channel condition, e.g., from pilots transmitted by each MS, and then decides which MS to schedule based on this information. A difference from the downlink scheme described above is that there is no need for feedback of the channel state information. This is because the BS itself estimates the uplink channel condition and schedules the MSs using a scheduling algorithm that favors the MSs whose channel states are good over those with poor channel statistics. Uplink transmit schedule information is transmitted from the BS to the MSs so that they know when, and at what rate, to transmit information to the BS.

It should be noted that the scheduling and data rate control techniques described above for use with downlinks and uplinks are applicable in cellular environments wherein multiple potentially overlapping cells exist. Given bandwidth reuse among cells, the link from the BS to the MS may be characterized by two quantities in a cellular environment: the quality of the channel from the BS to the MS and the interference caused by transmissions in other cells. Both these quantities go through the same type of fluctuations under the scheme described above and the BS can schedule transmissions to and from those MSs which have both good channel conditions and limited interference from other cells as well as control the rate of uplink and/or downlink transmissions.

The methods and apparatus of the present invention are applicable to a wide range of Multiple Access techniques. In the description above, we have recognized that a great deal of flexibility exists in how the resources, particularly bandwidth and time, are split among the MSs and thus various users.

We will now discuss various exemplary splits in resources which can be applied in various cases. Numerous additional possibilities exist. For purposes of brevity we will limit the following discussion to examples applied to the downlink with the understanding that the same or similar resource allocation techniques can be applied to uplinks as well.

(a) TDMA: In this case, time is slotted and only one MS is transmitted to from the BS. In this case, the schedule policy used by the BS can be to simply decide which MS to transmit to at any slot of time.

(b) FDMA: The application of our scheme is a bit more involved in this case. Now feedback is used from the MS regarding the quality of the channel in each of the frequency slots. Then the BS can schedule the MSs to those frequency slots where the MS has the best channel condition.

(c) CDMA: Under the restriction that users with orthogonal or almost orthogonal codes only are allowed to be transmitted to, the scheme described above applies directly. In particular, if one MS is transmitted to, then the applicability is direct.

(d) OFDM: This scenario is very similar to FDMA. Here the frequency slots are "logical", in the sense that each slot is actually a particular hopping sequence. However, the hopping sequences are nonoverlapping in time and thus the equivalence to FDMA from the point of view of orthogonality of the different slots.

Numerous additional embodiments and variations of the above described methods and apparatus will be apparent to those skilled in the art in view of the above description of the present invention. Such methods and apparatus are to be considered within the invention described herein.

Figure 11A:
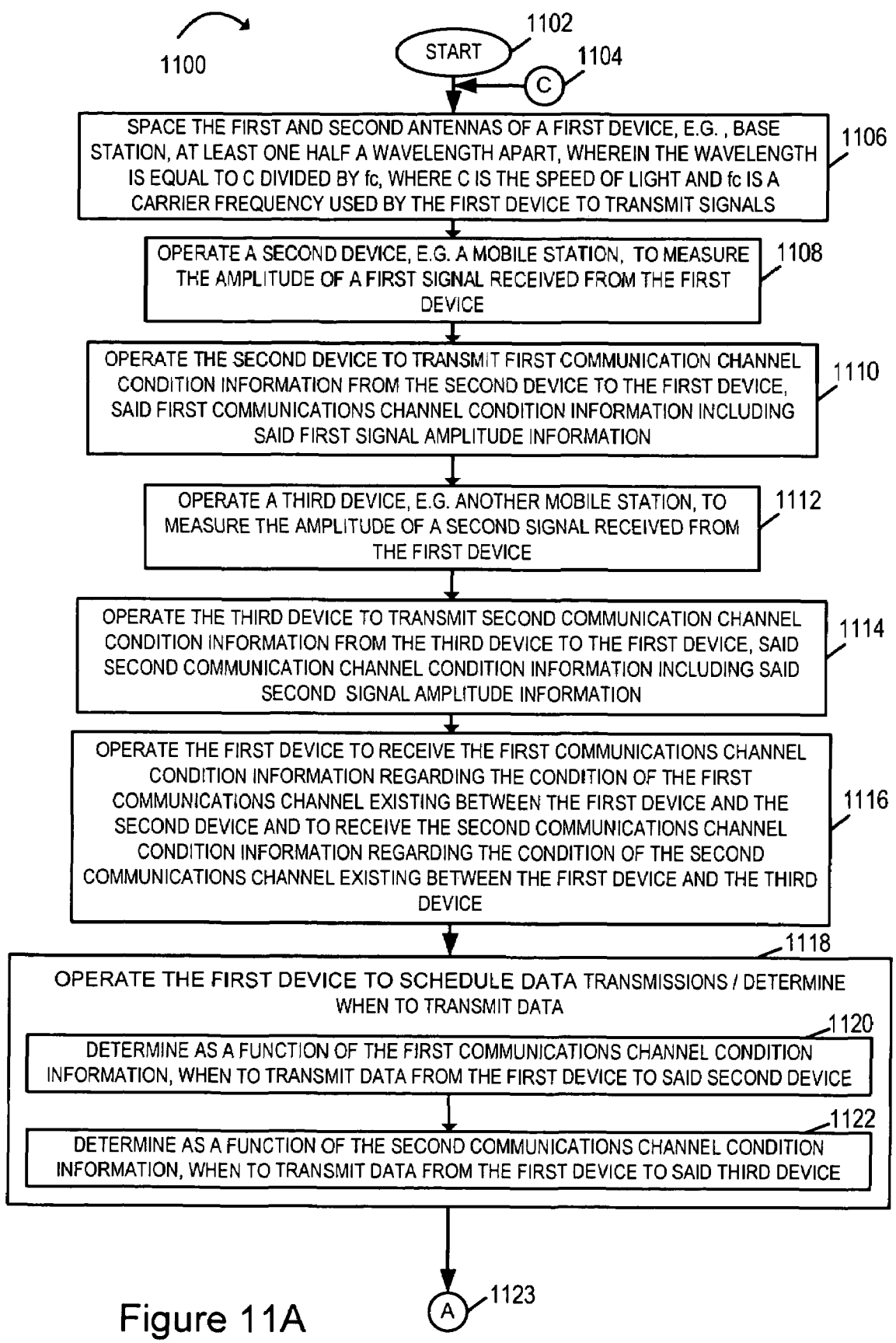
FIG. 11, which comprises the combination of FIGS. 11A, 11B and 11C, illustrates the steps of an exemplary communications method implemented in accordance with the invention.
Figure 11B:
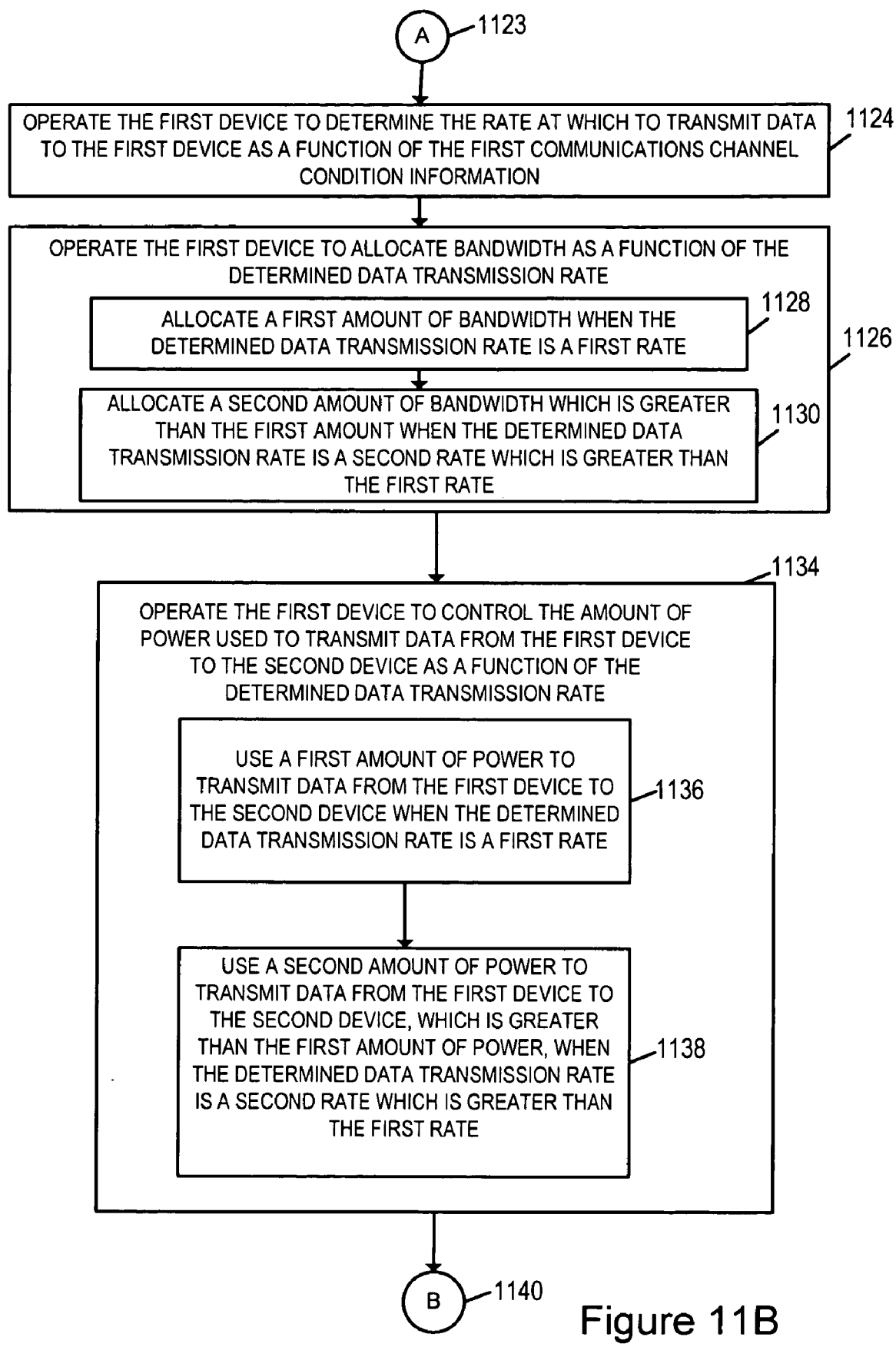
Figure 11C:
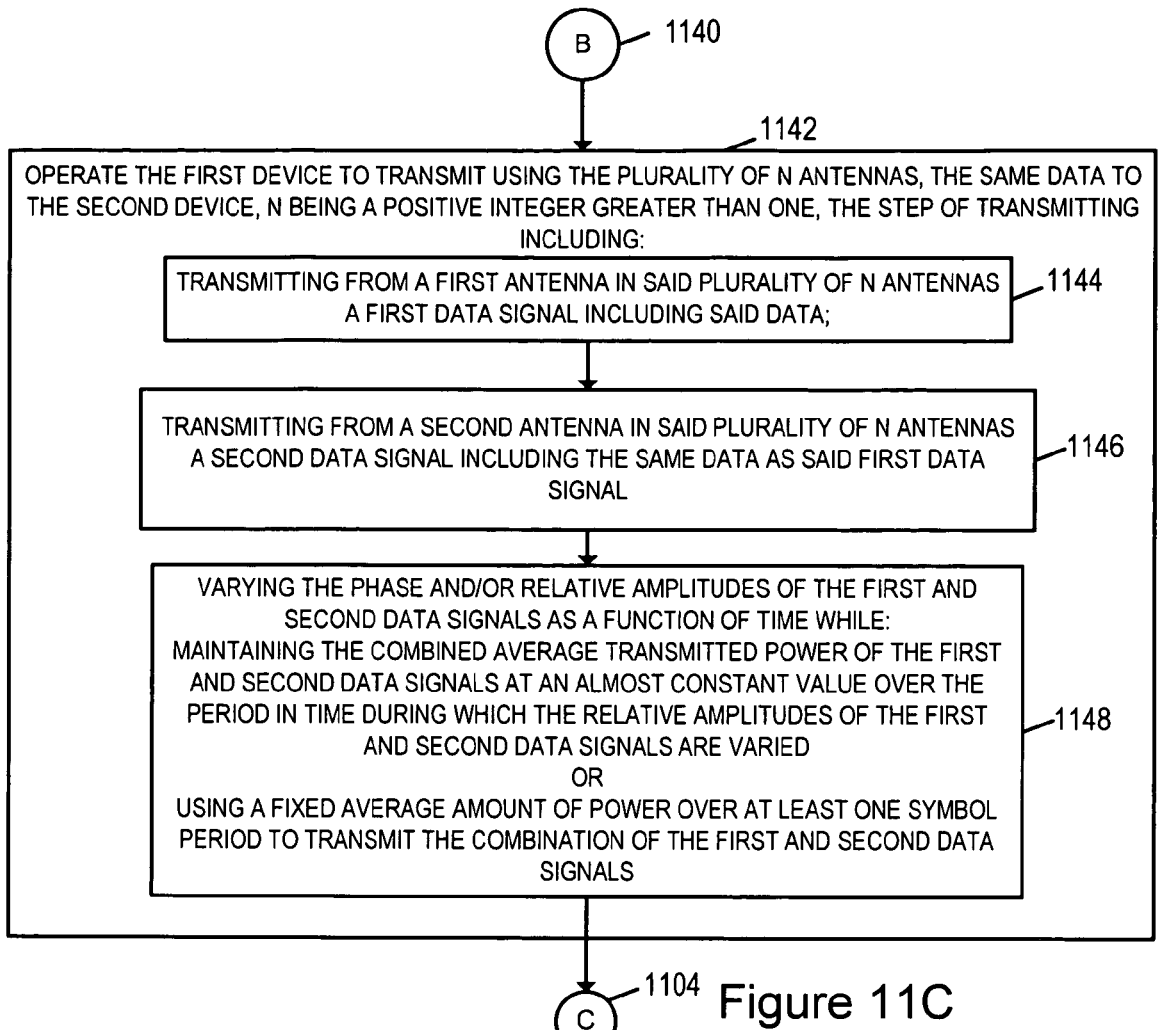
Figure 11:
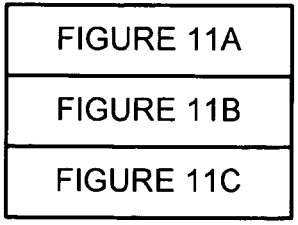

An exemplary communications method 1100 implemented in accordance with the present invention will now be described with regard to FIG. 11 which comprises the combination of FIGS. 11A, 11B and 11C. The method may be used in a system including a first device, e.g., base station 502, a second device, e.g., a mobile station 504 and a third device, e.g., another mobile station 506, such a system is illustrated in FIG. 5.

The method 1100 beings at START node 1102 with the first step being performed in step 1106. In step 1106, first and second antennas of the first device 502, e.g., base station, are spaced at least one half a wavelength apart, wherein the wavelength is equal to C divided by fc, where C is the speed of light and fc is a carrier frequency used by the first device to transmit signals. In some embodiments N antennas are used where N is greater than two. Following step 1106, in step 1108, the second device 504, e.g., a first mobile station, is operated to measure the amplitude of a first signal received from the first device 502. Then in step 1110, the second device 506 is operated to transmit first communication channel condition information to the first device 502, said first communications channel condition information including the measured first signal amplitude information. The third device, e.g., second mobile station 506, is operated in step 1112 to measure the amplitude of a second signal received from the first device 502 and then, in step 114, to transmit second communication channel condition information to the first device, said second communication channel condition information including the measured second signal amplitude information.

In step 1116, the first device 502 is operated to receive the first communications channel condition information regarding the condition of the first communications channel existing between the first device 502 and the second device 504, and to receive the second communications channel condition information regarding the condition of the second communications channel existing between the first device 502 and third device 506. Then, in step 1118 the first device 502 is operated to schedule data transmissions, e.g., to determine when to transmit data to the first and second devices 504, 506. In sub-step 1120 the first device determines, as a function of the first communications channel condition information, when to transmit data from the first device 502 to the second device 504. In sub-step 1122 the first device determines, as a function of the second communications channel condition information, when to transmit data from the first device 502 to the third device 506. Operation proceeds from scheduling step 1118 to step 1124 via connecting node 1123.

In step 1124, the first device 502 is operated to determine the rate at which to transmit data to the first device as a function of the first communications channel condition information. Then, in step 1126, the first device is operated to allocate bandwidth as a function of the determined data transmission rate. Step 1126 includes sub-steps 1128 and 1130. Sub-step 1128, is performed when the determine data transmission rate is a first rate. In sub-step 1128, the fist device 502 allocates a first amount of bandwidth. Sub-step 1130 is performed when the determined data transmission rate is a second rate which is greater than the first rate. In sub-step 1130, the first device 502 allocates a second amount of bandwidth which is greater than the first amount of bandwidth.

Operation proceeds from bandwidth allocation step 1126 to power control step 1134. In step 1134, which includes sub-steps 1136 and 1138, the first device 502 controls the amount of power used to transmit data from the first device 502 to the second device 504 as a function of the determined data transmission rate. In sub-step 1128, which is performed when the determined data transmission rate is a first rate , a first amount of bandwidth is allocated. In sub-step 1130, which is performed when the determined data transmission rate is a second rate which is greater than the first rate, a second amount of bandwidth is allocated.

Operation proceeds from step 1126 to step 1134. In step 1134, which includes sub-steps 1136 and 1138, the first device controls the amount of power used to transmit data from the first device 502 to the second device 504 as a function of the determined data transmission rate. In sub-step 1136, which is performed when the determined data transmission rate is a first rate, a first amount of power is used to transmit data from the first device 502 to the second device 504. In sub-step 1138 which is performed when the determined data transmission rate is a second rate which is greater than the first rate, a second amount of power is used to transmit data from the first device 502 to the second device 504.

Operation proceeds from step 1134 to step 1142 via connecting node 1140. In step 1142 the first device 502 is operated to transmit, using the plurality of N spaced antennas, the same data to the second device 504, where N is greater than one. Step 1142 includes sub-steps 1144, 1146 and 1148. In sub-step 1144 the first device 502 transmits from a first antenna in the plurality of N antennas a first data signal including the data to be transmitted. In sub-step 1146, the first device 502 uses a second antenna in the plurality of N antennas to transmit a second data signal including the same data as the first data signal. In sub-step 1148, the first device 502 varies the phase and/or relative amplitudes of the first and second data signals as a function of time while: 1) maintaining the combined average transmitted power of the first and second data signals at an almost constant value over the period of time during which the relative amplitudes of the first and second data signals are varied or 2) using a fixed average amount of power over at least one symbol period to transmit the combination of the first and second data signals.

The transmission process continues over time with operation proceeding from step 1142 back to step 1106 via connecting node C 1104.

What is claimed is:

1. A communications apparatus, comprising:
   a source of data;
   a transmitter circuit coupled to the source of data for generating a plurality of data signals each data signal including the same data, the plurality of data signals including a first data signal and a second data signal the first and second data signals differing from one another as a function of time by at least one of a phase and an amplitude, the transmitter circuit including means for independently varying the phase of at least one of the first and second data signals as a function of time;
   a plurality of antennas coupled to said transmitter circuit to receive and transmit said data signals in parallel, each antenna receiving and transmitting one of said data signals;
   a receiver for receiving communications channel condition information from a plurality of mobile stations regarding the condition of a communications channel associated with individual ones of said plurality of mobile stations;
   means for scheduling transmission of data to individual mobile stations as a function of the received communications channel condition information wherein the means for scheduling includes a scheduling routine which gives preferential treatment to the scheduling of data transmissions to mobile stations with good communications channels as compared to mobile stations with poorer communications channels; and
   means for determining the rate at which data should be transmitted in said first and second data signals as a function of the communications channel information.

2. A base station, the base station comprising:
i) a receiver for receiving communications channel condition information regarding the condition of a first communications channel existing between the base station and a mobile station and information regarding the condition of additional communications channels existing between the base station and a plurality of additional mobile stations;
ii) means for determining the rate at which data is transmitted to said mobile station as a function of the channel condition information;
iii) means for determining the order in which the base station is to transmit data to different mobile stations as a function of said communication channel conditionn information and said additional communications channel condition information; and
iv) means for introducing signal variations into signals transmitted to the mobile stations so that the mobile stations will detect fluctuations in received signal power.

3. The base station of claim 2, wherein signals transmitted to the mobile stations are OFDM signals.

4. The base station of claim 3, wherein said: means for determining the order in which the base station is to transmit data to different mobile stations as a function of said communication channel condition information and said additional communications channel condition information includes a scheduler routine stored in a memory.

5. The base station of claim 2, further comprising: includes:
at least a first and second antenna for broadcasting first and second signals including the same data to one of said mobile stations, the first and second signals having different phases.

6. A communications system, comprising:
a mobile station;
a plurality of additional mobile stations; and
a base station, the base station including:
i) a receiver for receiving communications channel condition information regarding the condition of a first communications channel existing between the base station and the mobile station and for receiving additional communications channel condition information regarding the condition of additional communications channels existing between the base station and said additional mobile stations;
ii) means for determining the rate at which data is transmitted to said mobile station as a function of the channel condition information;
iii) means for determining the order in which the base station is to transmit data to different mobile stations as a function of said communication channel condition information and said additional communications channel condition information; and
iv) at least a first and second antenna for broadcasting first and second signals including the same data to one of said mobile stations the first and second signals having different amplitudes.

7. A communications system, comprising:
a mobile station;
a plurality of additional mobile stations; and
a base station, the base station including:
i) a receiver for receiving communications channel condition information regarding the condition of a first communications channel existing between the base station and the mobile station and for receiving additional communications channel condition information regarding the condition of additional communications channels existing between the base station and said additional mobile stations;
ii) means for determining the rate at which data is transmitted to said mobile station as a function of the channel condition information;
iii) means for determining the order in which the base station is to transmit data to different mobile stations as a function of said communication channel condition information and said additional communications channel condition information; and
iv) means for introducing signal variations into signals transmitted to the mobile stations so that the mobile stations will detect fluctuations in received signal power.

8. The communication system of claim 7, wherein said means for introducng signal variatons into signals includes a plurality of antennas for transmitting the same data in parallel.

* * * * *